May 6, 1947.  H. G. CONWAY  2,420,066
LANDING GEAR CONTROL AND INDICATING ARRANGEMENT
Filed Oct. 9, 1942
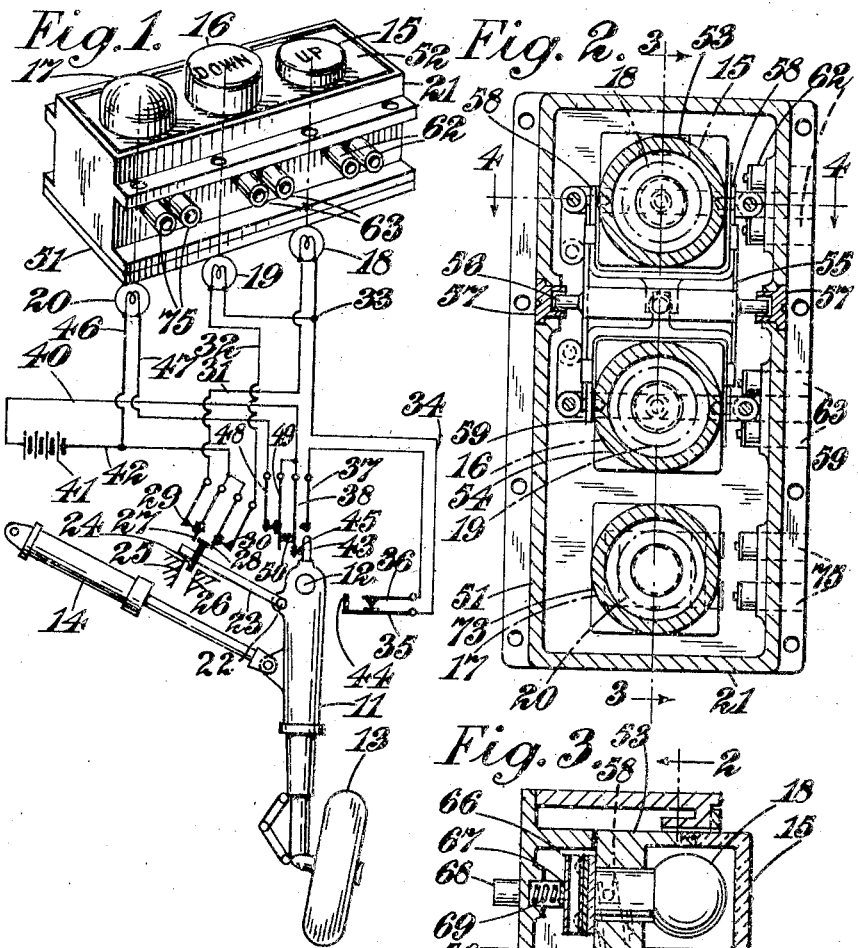
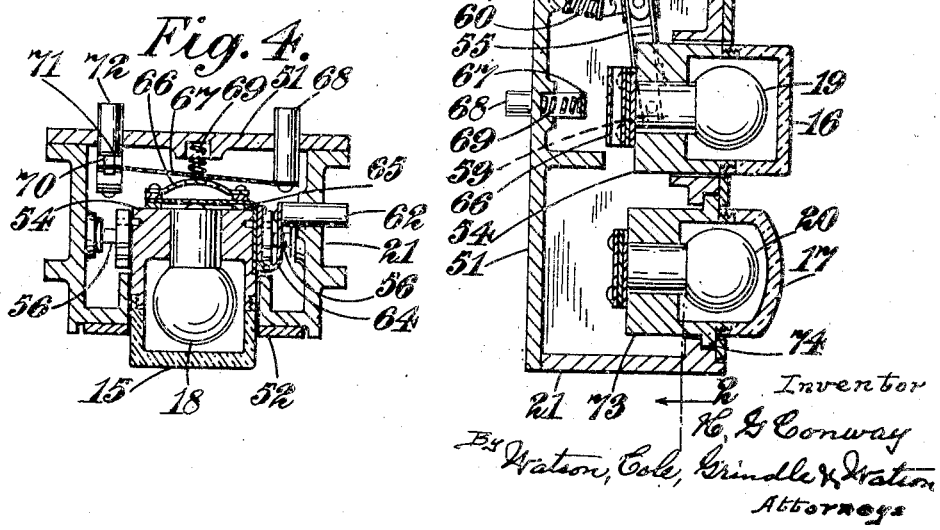
Inventor
H. G. Conway
By Watson, Cole, Grindle & Watson
Attorneys Patented May 6, 1947

2,420,066

UNITED STATES PATENT OFFICE 2,420,066

LANDING GEAR CONTROL AND INDICATING ARRANGEMENT

Hugh Graham Conway, Warrington, England, assignor to Aeronautical & Mechanical Investments Limited, a British company Application October 9, 1942, Serial No. 461,489
In Great Britain August 22, 1941

2 Claims. (Cl. 177—311)

This invention comprises improvements in or relating to control devices for the movement of aircraft-undercarriages and other parts. It is an object of the invention to facilitate control of the movements of aircraft parts by pilots and other persons in charge, particularly of undercarriages, although the invention could be applied to the control of the movements of parts such as bomb doors or releases or any occasionally movable parts if desired.

The invention comprises, in control devices for the movement of aircraft-undercarriages and other occasionally movable aircraft parts, the provision of means whereby the movement of the part to be controlled is determined by an electric push-button or like manual control-switch located close to the pilot and the push buttons or the like are illuminated by electric lamps or other indicators within or beside them, which indicators are in circuit with switch-means so operatively connected to the parts thus moved that their operation constitutes an indication of the correct operation of the parts.

More specifically, as applied to aircraft-undercarriage control devices, the invention comprises the employment of an electric control device comprising a "down" push-button or like switch for down movement, an "up" push-button or like switch for up movement, means to cause the undercarriage to move down when the "down" switch is operated and up when the "up" switch is operated, an electric lamp or other electric indicator associated with each such switch and further switch-means associated with the undercarriage and so connected to the indicators of the "up" and "down" switches that on upward movement of the undercarriage the "up" switch indicator operates and on downward movement of the undercarriage the "down" switch indicator operates.

It is a feature of the invention that the pushbutton or like switches need be operated only momentarily, but the indicators are maintained in operation, once movement of the part commences, independently of release of the switches.

By the present invention the pilot or other operator gets an indication when he presses the button of whether the devices are responding to his control and he does not have to move his eyes from the button which he is pressing in order to observe the indication of the response.

The following is a description by way of example of an installation in accordance with the invention as applied to the operation of a retractable undercarriage strut:

In the accompanying drawings:

Figure 1 is a diagram of electrical connections;

Figure 2 is a part section of a push-button, for use in accordance with the invention, on the line 2—2 of Figure 3;

Figure 3 is a central longitudinal section upon the line 3—3 of Figure 2, and

Figure 4 is a cross-section on the line 4—4 of Figure 2.

Referring to Figure 1, the undercarriage comprises a leg 11 pivoted at 12 and provided with a landing wheel 13 and retraction jack 14. These parts may be of any desired or usual construction and, in themselves, constitute no part of the present invention. The means for determining the operation of the jack 14 comprises a push-button 15 which when operated will close an electric circuit, causing retraction of the jack 14 and raising of the undercarriage, and another push-button 16 which when operated will cause extension of the jack 14 and lowering of the undercarriage. The connections from the push-buttons 15, 16 to the valves for controlling the hydraulic circuit of the jack 14 are not shown in the drawing.

In addition to the push-buttons 15, 16 there is provided an indicator lamp 17. The push-buttons 15, 16 are made hollow and transparent and each comprise fittings for the supply of electric current and an internal illuminating lamp bulb or bulbs. In the diagram, Figure 1, the lamp bulb of the up buttons 15 is indicated separately below the push-buttons at 18, the bulb of the pushbutton 16 is shown at 19 and the bulb of the indicator window 17 is shown at 20.

As will be seen the push-buttons 15, 16 and the indicator window 17 are arranged in a switch block 21 so that they project from the face of the switch block and the push-buttons 15, 16 are made large enough to be readily operated by the gloved hand of an aircraft pilot. Conveniently, the "up" button is labelled "Up" and is coloured amber, the "down" button is labelled "Down" and coloured red and the indicator lamp 17 is coloured green.

The movable cylinder 11 of the shock absorber leg of the undercarriage is pivoted at 22 to a sliding rod 23 on which is mounted an insulating block 24 capable of a limited degree of movement from side to side between stops 25, 26. The block 24 is friction tight on the sliding rod 23 and this mechanism constitutes a friction-drive lost-motion connection, so that the greater part of the movement of the jack 11 is lost but initial movement in either direction moves the friction block 24 against the stop 25 or 26 as the case may be; thus when the undercarriage is being raised the friction block 24 will move in one direction and when the undercarriage is being lowered it will move in the other direction. The friction block 24 is located between two arms 27, 28 of a two-way switch operating between contacts 29, 30. The contact 29 which is closed when the undercarriage rises is connected by a line 31 to the lamp 18 in the "up" push-button 15 and the contact 30 which is closed when the undercarriage moves downward is connected by a line 32 to the lamp 19 in the "down" push-button 16. The other terminals of the lamps 18, 19 are connected together at 33 and thence by a line 34, normally closed switch contacts 35, 36, further normally closed switch contacts 37, 38 and line 40 to one terminal of a battery 41 or other source of electric supply. The other terminal of the battery 41 is connected by a line 42 to the switch arms 27, 28.

A projection 43 from the hub of the undercarriage shock absorber 11 serves to engage in either of its extreme positions insulated blocks 44, 45 on the before-mentioned switch members 35, 38 respectively. Thus when the undercarriage is fully lowered the contacts 37, 38 are opened and when it is fully raised the contacts 35, 36 are open, in either event breaking the circuit of the lamps 18, 19 so that whichever of them may have been illuminated (depending upon the direction of movement) is put out when the movement is completed; in this way the lamp 18 or 19, as the case may be, will only be illuminated when the undercarriage is actually moving.

The indicator lamp 20 before the green window 17 is connected by a line 46 to the battery 41 and by a line 47 to a contact arm 48 which engages a second contact arm 49 adjacent to the contact arm 38, before referred to, and like that arm connected to the battery 41 by the line 40. An insulating block 50 joins the arms 38, 49 so that when the downward movement of the undercarriage is completed the projection 43 on the hub of the shock absorber will not only break the circuit of the push-button lamps 18, 19 but will simultaneously make the circuit of the green lamp 20.

The operation will be obvious: If the pilot wishes to retract the undercarriage he presses momentarily upon the amber "up" push-button 15 and thereby starts retraction of the jack 14. This continues and from the moment of its commencement the friction block 24 is moved toward the stop 25, engages the switch arm 27 and thereby closes the lamp-circuit of the push-button 15 on which the pilot has pressed. The push-button therefore, if the undercarriage responds to the impulse transmitted by the pilot, will light up. If it remains without moving, the pilot is aware of the fact because the push-button fails to light. When retraction is completed the push-button is automatically put out and thus the pilot is made immediately aware of completion of the movement. On the other hand, if the "down" push-button 16 is pressed the jack 14 begins to extend, the friction block 24 of the lost-motion connection is moved into contact with the switch contact arm 28, the lamp 19 in the "down" push-button is illuminated and the illumination continues, whether the pressure of the pilot's hand is maintained or not, until the undercarriage is fully extended, whereupon the projection 43 will break the contacts 37, 38 and the "down" lamp will be extinguished. Not only will it be extinguished but at the same moment the contacts 48, 49 will be closed and the lamp 20 behind the green window 17 will be illuminated, thus giving the pilot a positive indication that the undercarriage is fully extended and that landing is safe. Without the lamp 17 the pilot might consider it safe to land merely because the lamp 19 is extinguished and this would not allow for the possibility of error due to failure of current.

It will be clear that other apparatus, the operation of which is invisible to the operator, can have its movements signalled to the person controlling them in a similar way.

The internal construction of the switch block 21 is shown in Figures 2 to 4. It will be noted that the switch block comprises not only the body portion 21 but a removable base 51, and cover 52. Translucent front portions of the push-buttons 15, 16 are screwed to body portions 53, 54, in which are located the lamps 18, 19. The body portions are made to slide through the switch block 21 and the cover 52, which are formed so as to afford guidance to keep them in a straight line. The push-buttons are interconnected by a lever 55 pivoted at 56 in the sides of the switch block 21 by means of hollow pivot screws 57. The lever has forked ends 58, 59 which engage pins projecting from the sides of the push-button body portions 53, 54. As can be seen from Figure 2, the lever is itself branched so as to engage both sides of each push-button. A spring 60 connects a pivot point 61 of the lower lever with the bottom 51 of the switch block. If this spring is a compression spring it will act as a toggle and will hold the push-buttons firmly over in either extreme position; if it is a tension spring it will tend to draw the push-buttons into the intermediate position, when the circuit of neither of them is closed, but the circuit of either button can be closed momentarily by pushing it inward and then releasing it.

The electric lamps 18, 19 are connected to their circuits through terminals in the side of the switch block which are shown at 62 for the lamp 18 and 63 for the lamp 19. As seen in Figure 4 the terminals 62, 63 enter into the side of the switch block and support spring-rubbing members 64 which rub on the sides of the push-button bodies 53, 54. On these parts of the push-button bodies there are contacts 65 which are bent round beneath the body of the push-button and engage the terminals on 69 beneath them and at their free ends they carry contacts 70 which are adapted, when the push button is pushed inwardly, to close circuits 71 on other terminals 72. Thus when either of the push buttons 15 or 16 are pressed inwardly it closes the circuit connecting the corresponding terminals 69, 72, but as soon as the push button moves out again the circuit is opened. If the push button is required to close simultaneously more than one circuit it is perfectly possible to locate two contact springs 67 side by side beneath a single push button.

It will be observed that the lamp 20 is mounted in a lamp holder 73 which is similar to the body portions 53, 54 of the push buttons 15, 16 except that it has a flange 74 which prevents inward sliding movement. This lamp holder is connected electrically to terminals 75 in the side of the switch block 21 in a way similar to that in which the lamps in the push buttons 15, 16 are connected to the terminals 62, 63.

Thus it will be appreciated that the terminals 62, 63, 75 are connected to the circuits shown in Figure 1, while the terminals 69, 72 are connected to the circuit which controls the movements of the undercarriage.

I claim:

1. In control devices for occasionally movable parts of aircraft or the like, in combination, a control element for causing movement of an aircraft part in one direction, a second control element for causing movement of said part in the opposite direction, power-operated means under the control of said elements for effecting the movements in both said directions, a first electric indicator disposed in proximity to the first named control element, a second electric indicator disposed in proximity to said second control element, indicator-actuating switch-means electrically connected with the indicators, and mechanical connections between the aircraft part itself and said switch-means, said switch-means and mechanical connections including a switch for energizing said first named indicator upon the initiation of movement of said part in the first named direction, a switch for energizing said second indicator upon initiation of movement of said part in said opposite direction, and limit switches engageable by said part at the ends of the movements thereof in both directions, means connecting each said limit switch in the circuit of the indicator which is energized by movement of the part toward the limit switch, so as to cut out said indicator when said movement is completed.

2. In control devices for occasionally movable parts of aircraft or the like, in combination, a control element for causing movement of an aircraft part in one direction, a second control element for causing movement of said part in the opposite direction, power-operated means under the control of said elements for effecting the movements in both said directions, a first electric indicator disposed in proximity to the first named control element, a second electric indicator disposed in proximity to said second control element, indicator-actuating switch-means electrically connected with the indicators, and mechanical connections between the aircraft part itself and said switch-means, said switch-means and mechanical connections including a switch for energizing said first named indicator upon the initiation of movement of said part in the first named direction, a switch for energizing said second indicator upon initiation of movement of said part in said opposite direction, limit switches engageable by said part at the ends of the movement thereof in both directions, and means connecting said limit switches in series and in circuit with both said indicators, so as to cut out the energized indicator when said movement is completed.

HUGH GRAHAM CONWAY.

REFERENCES CITED

The following references are of record in the file of this patent:

UNITED STATES PATENTS

| Number | Name | Date |
| --- | --- | --- |
| 2,156,012 | Doyle | Apr. 25, 1939 |
| 506,729 | Rex | Oct. 17, 1893 |
| 1,715,505 | Klumpp | June 4, 1929 |
| 1,996,268 | Ambuhl et al. | Apr. 2, 1935 |
| 1,719,471 | Hoffman | July 2, 1929 |
| 1,509,010 | Wenzel | Sept. 16, 1924 |
| 1,408,611 | Larner | Mar. 7, 1922 |
| 790,548 | Atwood | May 23, 1905 |
| 2,134,695 | Bigman | Nov. 1, 1938 |
| 2,185,748 | Kebelman | Jan. 2, 1940 |
| 1,118,827 | Thomas | Nov. 24, 1914 |
| 1,194,386 | Horton | Aug. 15, 1916 |
| 2,217,526 | Pelikan | Oct. 8, 1940 |
| 534,597 | Atwood et al. | Feb. 19, 1895 |
| 1,176,202 | Cheney | Mar. 21, 1916 |
| 1,352,946 | Felton | Sept. 14, 1920 |
| 2,116,960 | Brown et al. | May 10, 1938 |
| 2,407,018 | MacKenzie | Sept. 3, 1946 |